United States Patent
Ma et al.

(10) Patent No.: US 11,120,041 B2
(45) Date of Patent: Sep. 14, 2021

(54) MAINTAINING SYNCHRONIZATION OF COLLECTED DATA AND INSIGHTS

(71) Applicant: International Business Machines Corporation, Armonk, NY (US)

(72) Inventors: Jing Yan Ma, Beijing (CN); Bo Chen Zhu, Xi'an (CN); Peng Fei Tian, Beijing (CN); Yu Ying Wang, Beijing (CN); Cheng Fang Wang, Beijing (CN); Fu Li Bian, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 271 days.

(21) Appl. No.: 16/448,164

(22) Filed: Jun. 21, 2019

(65) Prior Publication Data

US 2020/0401601 A1    Dec. 24, 2020

(51) Int. Cl.
*G06F 16/27* (2019.01)
*G06F 16/23* (2019.01)
*G06F 16/28* (2019.01)

(52) U.S. Cl.
CPC .............. *G06F 16/27* (2019.01); *G06F 16/23* (2019.01); *G06F 16/288* (2019.01)

(58) Field of Classification Search
CPC ......... G06F 16/27; G06F 16/23; G06F 16/288

USPC ......................................................... 707/634
See application file for complete search history.

(56) References Cited

U.S. PATENT DOCUMENTS

| | | |
|---|---|---|
| 9,589,233 B2 | 3/2017 | Peev |
| 10,758,732 B1 * | 9/2020 | Heldman ............... G16H 20/30 |
| 2006/0167784 A1 * | 7/2006 | Hoffberg ............... G06Q 50/188 |
| | | 705/37 |
| 2008/0228761 A1 * | 9/2008 | Kei Leung ............. G06F 16/90 |
| 2010/0105061 A1 * | 4/2010 | Jacob ................... C12Q 1/6883 |
| | | 435/6.1 |
| 2017/0286525 A1 * | 10/2017 | Li ......................... G06F 16/287 |
| 2018/0174059 A1 | 6/2018 | Banerjee |
| 2018/0189990 A1 | 7/2018 | Cardno |
| 2018/0219889 A1 * | 8/2018 | Oliner ...................... G06N 3/04 |
| 2018/0365309 A1 | 12/2018 | Oliner |
| 2019/0243641 A1 * | 8/2019 | Gass ....................... G06F 8/427 |
| 2020/0302234 A1 * | 9/2020 | Walters .................. G06K 9/628 |

* cited by examiner

*Primary Examiner* — Dung K Chau
(74) *Attorney, Agent, or Firm* — Stephanie L. Carusillo

(57) ABSTRACT

In an approach for maintaining data synchronization, a processor scans a set of data fields at each stage of a data analysis process. A processor generates a relationship tree model, wherein the set of data fields each correspond to a node in the relationship tree model. A processor prunes the relationship tree model. Responsive to an update to a data field of the set of data fields, a processor promulgates the update using the relationship tree model to generate an updated set of insight data. A processor outputs the updated set of insight data.

20 Claims, 7 Drawing Sheets

MAINTAINING SYNCHRONIZATION OF COLLECTED DATA AND INSIGHTS

BACKGROUND

The present invention relates generally to the field of data processing, and more particularly to maintaining synchronization of collected data and insights.

Data analysis is a process of inspecting, cleansing, transforming, and modeling data with the goal of discovering useful information, informing conclusions, and supporting decision-making. Data analysis has multiple facets and approaches, encompassing diverse techniques under a variety of names, and is used in different business, science, and social science domains. In today's business world, data analysis plays a role in making decisions more scientific and helping businesses operate more effectively. Insights are what is gained after data analysis is done.

SUMMARY

Aspects of an embodiment of the present invention disclose a method, computer program product, and computer system for maintaining synchronization of collected data and insights. A processor scans a set of data fields at each stage of a data analysis process. A processor generates a relationship tree model, wherein the set of data fields each correspond to a node in the relationship tree model. A processor prunes the relationship tree model. Responsive to an update to a data field of the set of data fields, a processor promulgates the update using the relationship tree model to generate an updated set of insight data. A processor outputs the updated set of insight data.

DETAILED DESCRIPTION

Figure 1:
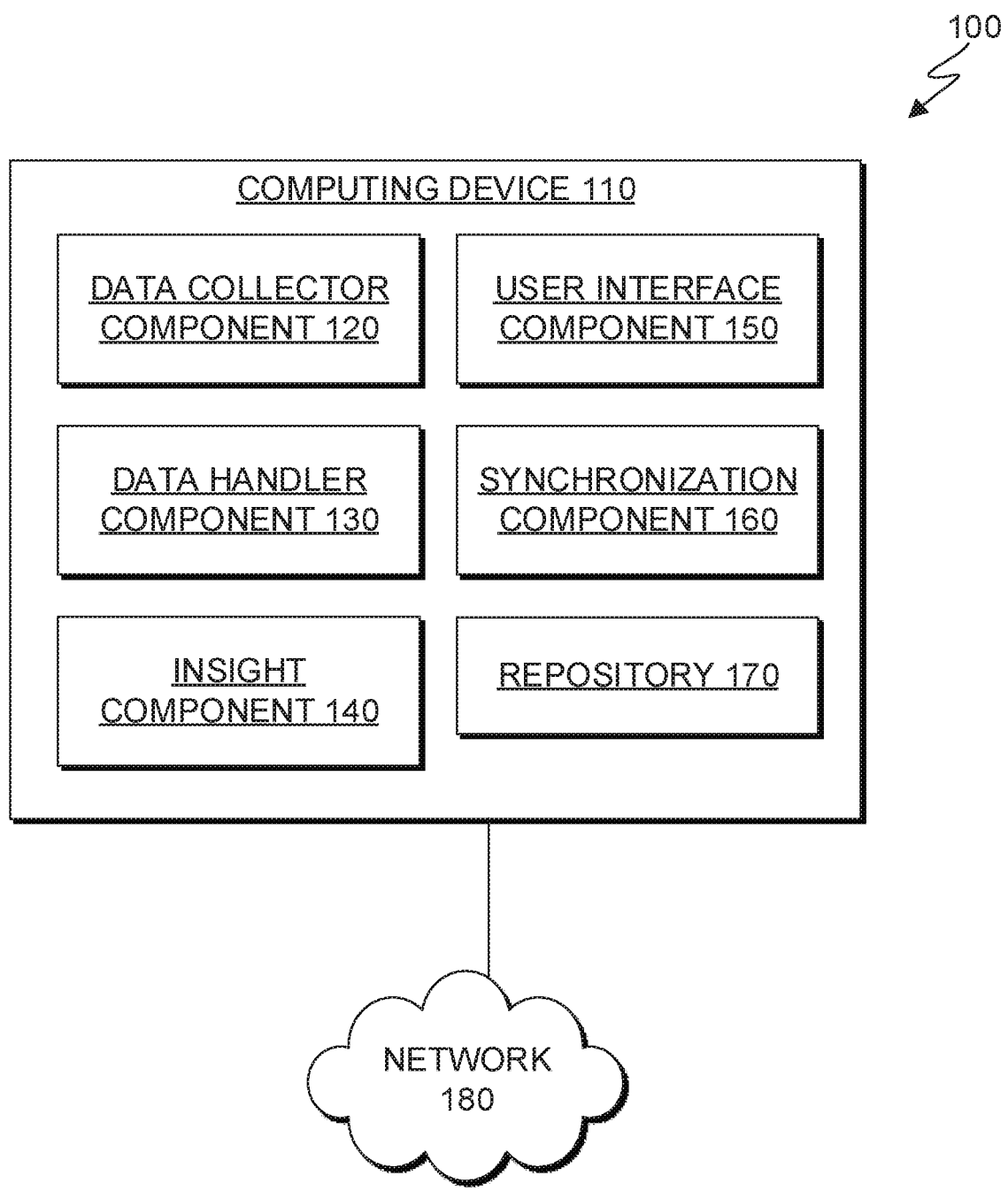
FIG. 1 depicts a block diagram of a data processing environment, in accordance with an embodiment of the present invention.

Embodiments of the present invention recognize that insights achieved from data analysis are becoming more and more important for businesses and industries. Insights gained through data analysis can be used to visualize data trends (i.e., in a model and/or a graph) to help businesses make important decisions. An issue arises when the collected raw data is updated, i.e., columns are changed or an attribute is changed. Then, the business must spend time completing the entire data analysis again to update the insights gained. Joint analysis, which is data analysis based on different views and dimensions, uses data fields of the collected raw data in complex program modules making it time consuming to re-do the data analysis to ensure correct insights are made. Additionally, the business may not be aware of an update to the collected data, and therefore, the insights are not updated leaving the business with incorrect insights. Embodiments of the present invention recognize the need for a system that can quickly locate and update any changes to the insights based on the updates to the collected raw data.

One such industry in which insights from data analysis is becoming more important is information technology (IT). Embodiments of the present invention recognize that as IT systems grow and become more complicated, managing these IT systems becomes more difficult. Traditionally, a key performance indicator (KPI) has been used to monitor system performance, but in a larger IT system, the number of KPIs necessary becomes unreasonably difficult to manage. This traditional IT management system makes it difficult for a user to find out what they need, i.e., a health status of the IT system. Joint analysis based on monitored data (e.g., system operation data) in an IT system helps by displaying to the user the insights (e.g., health status of the system, database, and/or middleware). But if a change to the monitored data occurs, the displayed insights will be incorrect, and the user would have to re-do the data analysis to re-generate correct insights, which would require an extensive amount of time.

Embodiments of the present invention provide a system that builds a relationship between raw data and insights generated through data analysis. A data analysis system can consist of a data collector component collecting the raw data from a data source, a data handler component formatting the raw data according to a specified policy, i.e., aggregation, calculation, combination, etc., an insight component analyzing the formatted data, and a user interface component presenting insight data to a user, e.g., in a chart, table, trend graph, etc. Embodiments of the present invention add a synchronization component that scans the entire data flow from raw data to insight data for relationships, and then generates a relationship tree with the raw data as the first layer, the formatted data as the middle layer, and insight data as the final layer. If, for example, one attribute of the raw data changes, then the synchronization component checks all connections in the relationship tree and makes appropriate changes. Embodiments of the present invention ensure consistency between the raw data and insight data at any time, so that businesses have accurate insights for decision-making.

Embodiments of the present invention provide a synchronization component that utilizes data scaling to reduce the amount and complexity of data in the data flow before using it to generate a relationship tree model. Embodiments of the present invention further provide a synchronization component that utilizes pre-defined relationship tree generation rules and data scaling output for pruning the relationship tree model reducing the complexity of the relationship tree model to improve performance in generating and using the relationship tree model.

Embodiments of the present invention provide a synchronization component that generates a relationship tree model (R) consisting of a vertex set (V) and an edge set (E), defined as $R=(V, E)$. Each attribute (i.e., data field) of the raw data, formatted data, and insight data corresponds to a vertex and each edge defines the specific relationship between the attributes. For vertices $X_i$, $X_j \in V$, the directed edges from $X_i$ to $X_j$ are represented by $X_i \rightarrow X_j$. When $X_i \rightarrow X_j \in E$, $X_i$ is the parent of $X_j$ in model R, and $X_j$ is the child of $X_i$. For any vertex $X \in V$ of model R, all parent nodes of X are represented as PaR(X) and all child nodes of X are represented as ChR(X).

The present invention will now be described in detail with reference to the Figures.

FIG. 1 depicts a functional block diagram illustrating data processing environment 100, in accordance with an embodiment of the present invention. FIG. 1 provides only an illustration of one embodiment of the present invention and does not imply any limitations with regard to the environments in which different embodiments may be implemented. In the depicted embodiment, data processing environment 100 includes computing device 110 and network 180. Network 180 operates as a computing network that can be, for example, a local area network (LAN), a wide area network (WAN), or a combination of the two, and can include wired, wireless, or fiber optic connections. In general, network 180 can be any combination of connections and protocols that will support communications between computing device 110 and another computing device (not shown). Data processing environment 100 may include additional servers, computers, or other devices not shown.

Computing device 110 operates to run a data analysis system for producing insights from raw data using a data collector component, data handler component, insight component, user interface component, synchronization component, and repository. Computing device 110 may be a management server, a web server, or any other electronic device or computing system capable of running a program and receiving and sending data. In some embodiments, computing device 110 may be a laptop computer, tablet computer, netbook computer, personal computer (PC), a desktop computer, a smart phone, or any programmable electronic device capable of communicating with another computing device (not shown) via network 180. In other embodiments, computing device 110 may represent a server computing system utilizing multiple computers as a server system, such as in a cloud computing environment. In the depicted embodiment, computing device 110 comprises data collector component 120, data handler component 130, insight component 140, user interface component 150, synchronization component 160, and repository 170. In other embodiments, computing device 110 may include additional components (not shown). Computing device 110 may include components as described in further detail in FIG. 7.

Data collector component 120 operates to collect raw data from a data source. Data handler component 130 operates to format the collected raw data according to a pre-specified policy, i.e., aggregation, calculation, combination, etc., to produce formatted data. Insight component 140 operates to analyze the formatted data to produce insight data. User interface component 150 operates as a user interface, i.e., a graphical user interface (GUI), to enable a user to view charts, tables, trend graphs, etc. of the insight data on computing device 110. In other embodiments, data collector component 120, data handler component 130, insight component 140, and/or user interface component 150 may reside on another computing device (not shown), provided that synchronization component 160 has access to computing device 110 via network 180.

Synchronization component 160 operates to scan data fields of the raw data, formatted data, and insight data to generate a relationship tree model that can be easily updated when a data field is modified, added, and/or deleted. In an embodiment, synchronization component 160 works in parallel to the entire data analysis process flow through data collector component 120, data handler component 130, insight component 140, and user interface component 150 to scan data fields at each data flow step. In an embodiment, synchronization component 160 generates a relationship tree model based on the scanned data fields from each step of the data flow. In an embodiment, synchronization component 160 uses the relationship tree model to promulgate an update to a data field to the other scans of that data field. For example, synchronization component 160 promulgates an update to a data field of the raw data to the data field of the formatted data and insight data. In the depicted embodiment, synchronization component 160 resides on computing device 110. In other embodiments, data quality program 122 may reside on another computing device (not shown), provided that synchronization component 160 has access to computing device 110 via network 180.

Repository 170 operates as a data repository for storing data collected and/or generated by components of computing device 110. Data may include, but is not limited to, raw data, formatted data, insights, and relationship tree models. Repository 170 can be implemented with any type of storage device capable of storing, gathering, and/or analyzing information, such as a database server, a hard disk drive, or a flash memory. In an embodiment, repository 170 is accessed by data collector component 120, data handler component 130, insight component 140, user interface component 150, and/or synchronization component 160 to store data. In another embodiment, repository 170 is accessed by data handler component 130, insight component 140, user interface component 150, and/or synchronization component 160 to access the data. In the depicted embodiment, repository 170 resides on computing device 110. In other embodiments, repository 170 may reside on another computing device (not shown), provided that data collector component 120, data handler component 130, insight component 140, user interface component 150, and synchronization component 160 has access to repository 170 via network 180.

Figure 2:
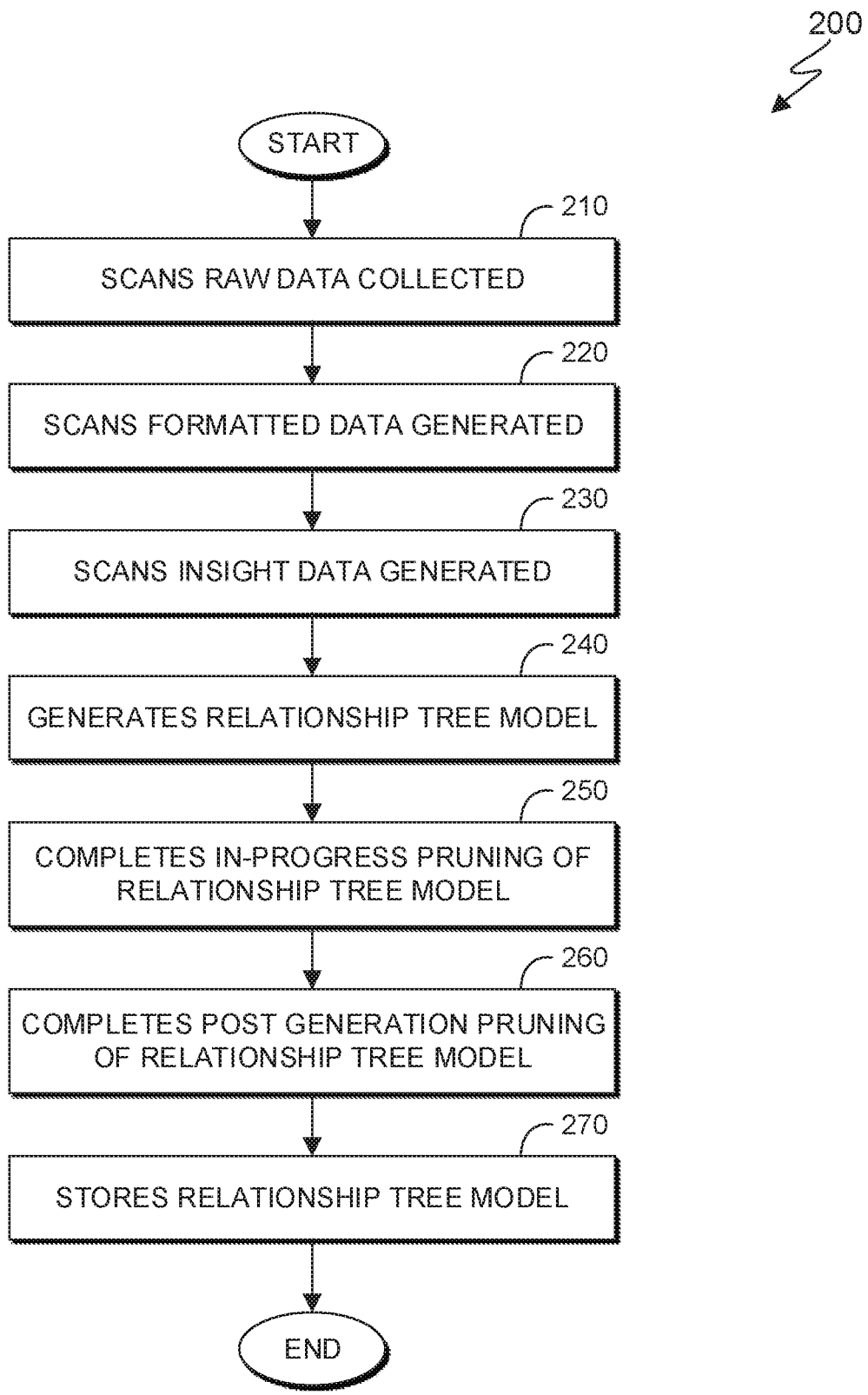
FIG. 2 depicts a flowchart of the steps of a process flow by a synchronization component for generating a relationship tree model, in accordance with an embodiment of the present invention.

FIG. 2 depicts a flowchart 200 of the steps of a process flow by synchronization component 160, in accordance with an embodiment of the present invention. In an embodiment, synchronization component 160 scans data fields of raw data, formatted data, and insight data to generate a relationship tree model. It should be appreciated that the process depicted in FIG. 2 illustrates one possible iteration of the process flow, which repeats for each data analysis process done by computing device 110.

In step 210, synchronization component 160 scans each data field of raw data collected. In an embodiment, synchronization component 160 scans each data field of raw data collected as the raw data is collected by data collector component 120. In an embodiment, synchronization component 160 analyzes a configuration of data collector component 120 to determine which type of data fields will be collected. In an embodiment, synchronization component 160 outputs a data record (typically a data field) in the form of metadata associated with each data field, i.e., a field name, a field type (e.g., raw, formatted, or insight), a program module that contains the data field, component that contains the data field (e.g., data collector, data handler, insight, and/or user interface), and other data fields that have relationship to the data field. In an embodiment, synchronization component 160 finds the relationship between the input and output of each module. In an embodiment, synchronization component 160 stores the data record in the form of metadata for each data field in repository 170.

In step 220, synchronization component 160 scans each data field of formatted data. In an embodiment, synchronization component 160 scans each data field of formatted data as the raw data is turned into formatted data by data handler component 130. In an embodiment, synchronization component 160 outputs a data record (typically a data field) in the form of metadata associated with each data field, i.e., a field name, a field type (e.g., raw, formatted, or insight), a program module that contains the data field, component that contains the data field (e.g., data collector, data handler, insight, and/or user interface), and other data fields that have relationship to the data field. In an embodiment, synchronization component 160 finds the relationship between the input and output of each module. In an embodiment, synchronization component 160 stores the data record in the form of metadata for each data field in repository 170.

In step 230, synchronization component 160 scans each data field of insight data. In an embodiment, synchronization component 160 scans each data field of insight data as the formatted data is turned into insight data by insight component 140. In an embodiment, synchronization component 160 outputs a data record (typically a data field) in the form of metadata associated with each data field, i.e., a field name, a field type (e.g., raw, formatted, or insight), a program module that contains the data field, component that contains the data field (e.g., data collector, data handler, insight, and/or user interface), and other data fields that have relationship to the data field. In an embodiment, synchronization component 160 finds the relationship between the input and output of each module. In an embodiment, synchronization component 160 stores the data record in the form of metadata for each data field in repository 170.

In step 240, synchronization component 160 generates a relationship tree model. In an embodiment, synchronization component 160 generates a relationship tree model based on pre-defined tree generation rules and the data record in the form of metadata output in steps 210, 220, and 230. In an embodiment, for each data record output, synchronization component establishes a node with the field name, module, and component information from the metadata output. In an embodiment, for each node, synchronization component identifies any data fields that affect a particular node (parent nodes) and any data fields that are affected by the particular node (child nodes). If there are no data fields that affect the particular node, then the particular node is a root node of the relationship tree model. See FIG. 4 for an example embodiment of a relationship tree model.

In step 250, synchronization component 160 completes an in-progress pruning. In an embodiment, synchronization component 160 completes an in-progress pruning of the relationship tree model while generating the relationship tree model. In an embodiment, synchronization component 160 completes an in-progress pruning for each module that prunes the middle status data of a module and results in only the input and output nodes being kept from that module. In each module, there are multiple statuses between the input and the output as the result of some form of data analysis done in each module. From the scanning done in steps 210, 220, and 230, synchronization component 160 will consider all these middle statuses as nodes making the relationship tree too complex for reasonable use, so synchronization component 160 will prune all the nodes indicating a middle status of a module as the relationship tree is being generated. In an embodiment, synchronization component 160 checks for any parents and any children of each node in a module. If a node has no children, the node will be an output for the module. If a node has no parent, the node will be an input of the module. If a node has at least one child or at least one parent, the node is pruned and only the path is kept. Example pseudocode that synchronization component 160 could use to complete the in-progress pruning:

```
Read input from the data stream after generated tree.
For each finished module, check each node variable A as:
    Check A. CHILDREN ( ).
        If none, keep. (Output for a module)
        If not none, check A. PARENT ( ).
            If none, keep. (Input for a module)
            Else, delete node A and keep the path.
Start next module.
```

In step 260, synchronization component 160 completes a post-generation pruning of the relationship tree model. In an embodiment, synchronization component 160 prunes the relationship tree model a second time according to one of two rules based on a usage goal of the relationship tree model. In an embodiment, synchronization component uses an end-to-end relationship rule when only the outputs of the modules belonging to the final component (i.e., insight component) are necessary based on a usage goal (e.g., a user only cares about the insight outputs and how they would be affected if the raw data was changed). According to this rule, synchronization component 160 prunes the nodes with a middle status keeping only root nodes and end nodes (i.e., insight nodes), so that the relationship tree model is simple with root nodes directly to end nodes (i.e., insight nodes). If the raw data is changed, synchronization component 160 will only have to update the end nodes (i.e., insight nodes). Example pseudocode that synchronization component 160 could use to prune the relationship tree model according to this rule:

If COMPONENT==insight & CHILDREN 0 is null, keep.

Else if NODE_TYPE< >ROOT, delete node and keep path.

In another embodiment, synchronization component 160 uses a component output rule when any middle layer outputs (i.e., formatted data layer) are necessary based on a usage goal (e.g., a user wants to be able to see any changes/updates to a middle layer based on a change to the raw data). According to this rule, synchronization component 160 prunes any nodes that are not output nodes from each component or module.

In step 270, synchronization component 160 stores the relationship tree model. In an embodiment, synchronization component 160 stores the final version of the relationship tree model after pruning in repository 170. In an embodiment, synchronization component 160 stores the relationship tree model for later use when a change has been made to a data field.

Figure 3:
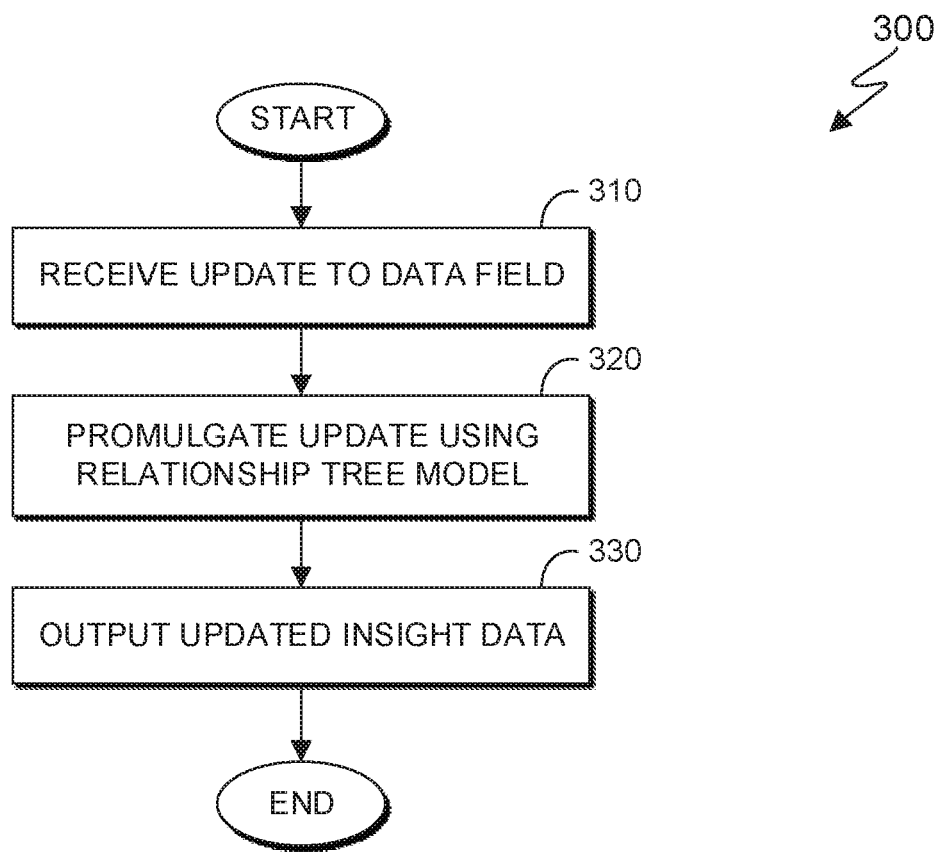
FIG. 3 depicts a flowchart of the steps of a process flow by a synchronization component when a change is made to a data field, in accordance with an embodiment of the present invention.

FIG. 3 depicts a flowchart 300 of the steps of a process flow by synchronization component 160, in accordance with an embodiment of the present invention. In an embodiment, synchronization component 160 identifies a change made to a data field and uses the relationship tree model to update related data fields in the raw data, formatted data, and insight data. It should be appreciated that the process depicted in FIG. 3 illustrates one possible iteration of the process flow, which repeats for each change identified by synchronization component 160.

In step 310 synchronization component 160 identifies a change made to a data field. A change to a data field includes a data field being updated, a data field being deleted, and/or a data field being added. In an embodiment, a change to a data field is done by the data source where the raw data was collected. In another embodiment, a change to a data field is done by a user of computer device 110 through user interface component 150.

In step 320, responsive to the change made to the data field, synchronization component 160 updates related data fields based on the relationship tree model. In an embodiment, responsive to a change made to a data field of the raw data, formatted data, and/or insight data, synchronization component 160 updates related data fields based on the relationship tree model. In an embodiment, synchronization component 160 queries any parent vertices and any child vertices of the vertex corresponding to the changed data field. In an embodiment in which the data field is modified, synchronization component 160 modifies any parent vertices and any child vertices of the vertex corresponding to the modified data field. See FIG. 5 for an example embodiment in which a data field is modified. In an embodiment in which the data field is added, synchronization component 160 adds a vertex corresponding to the added data field, any parent vertices, any child vertices, and corresponding directed edges between the parent vertices and added vertex and between the added vertex and the child vertices. In an embodiment in which the data field is deleted, synchronization component 160 deletes the vertex corresponding to the deleted data field, corresponding directed edges between the parent vertices, corresponding directed edges between the deleted vertex and between the deleted vertex and the child vertices, and any child vertices that do not have any remaining directed edges. See FIG. 6 for an example embodiment in which a data field is deleted.

In step 330, synchronization component 160 outputs updated data. In an embodiment, synchronization component 160 stores the updated raw data, formatted data, and/or insight data to repository 170. In an embodiment, synchronization component 160 outputs the updated insight data to user interface component 150.

Figure 4:
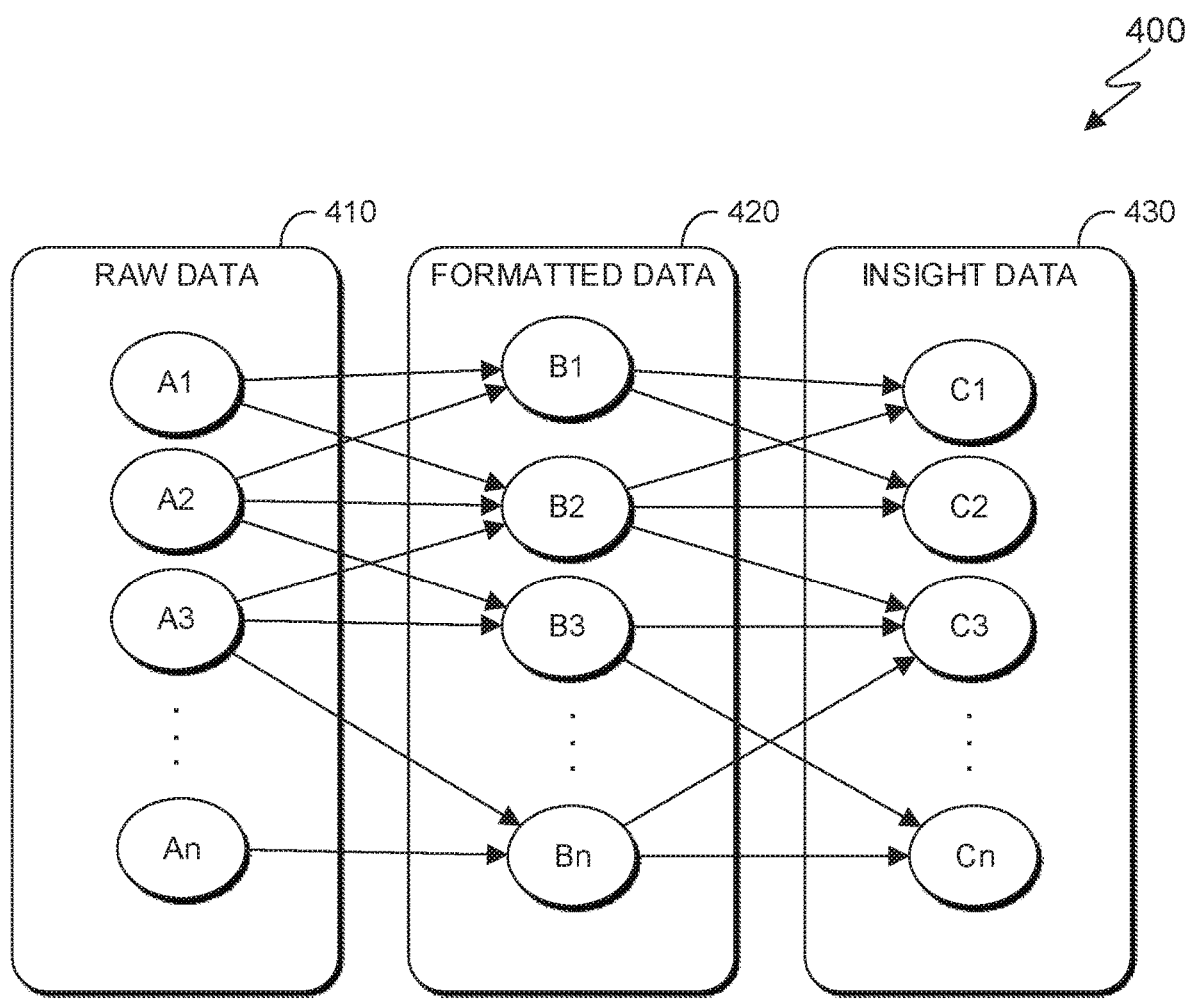
FIG. 4 depicts relationship tree model, in accordance with an embodiment of the present invention.

FIG. 4 depicts relationship tree model 400 in accordance with an embodiment of the present invention. In the depicted embodiment, relationship tree model 400 has raw data 410, formatted data 420, and insight data 430. In the depicted embodiment, raw data 410 has vertices A1 to An, formatted data 20 has vertices B1 to Bn, and insight data 430 has vertices C1 to Cn. In the depicted embodiment, directed edges are depicted as arrows showing the relationships between the raw data, formatted data, and insight data. For example, the parent vertices of B2, PaR(B2), are vertices A1, A2, and A3, and the child vertices of B2, ChR(B2), are vertices C1, C2, and C3.

Figure 5:
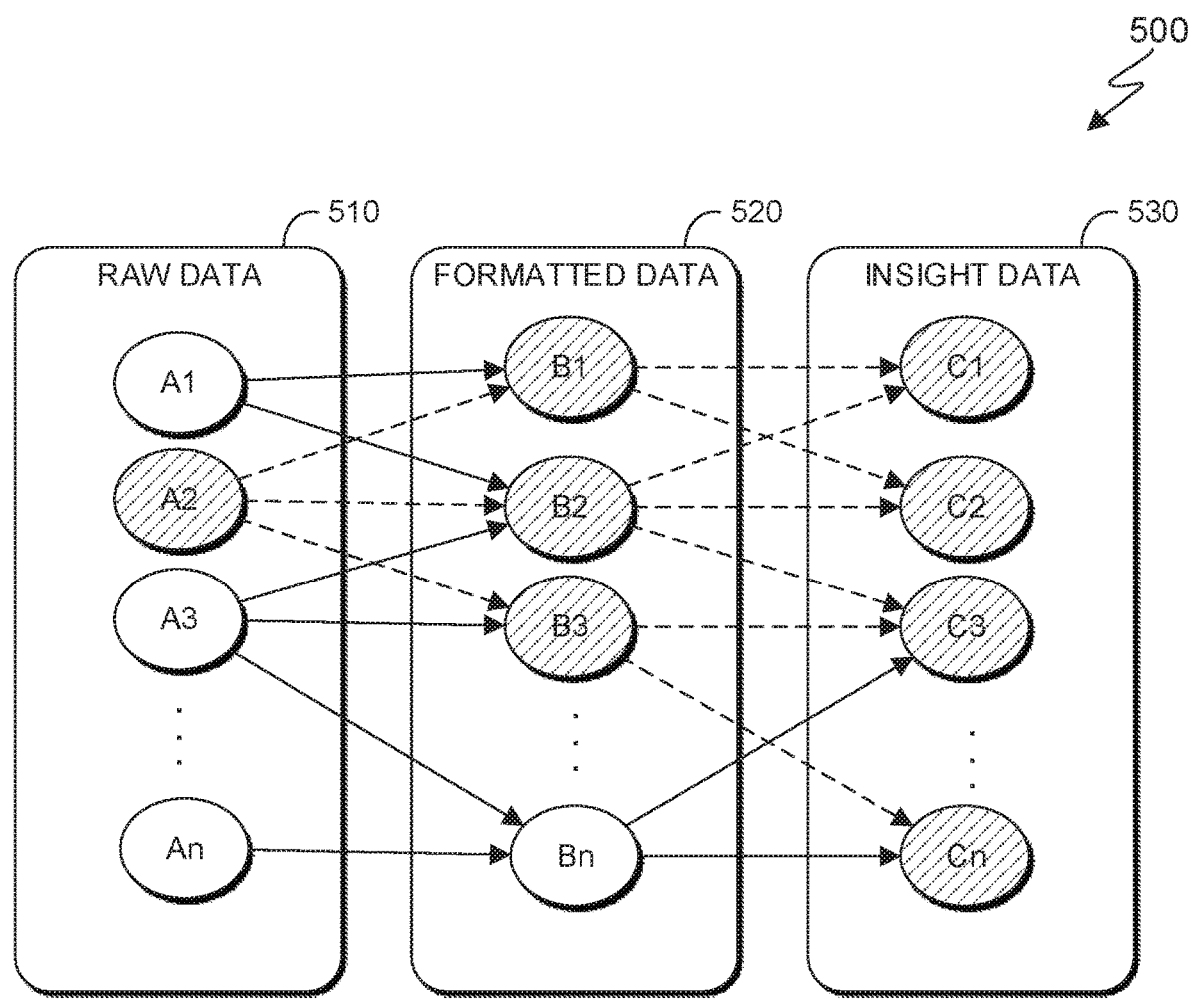
FIG. 5 depicts a relationship tree model in which a data field is modified, in accordance with an embodiment of the present invention.

FIG. 5 depicts a relationship tree model 500 in which a data field is modified, in accordance with an embodiment of the present invention. In an embodiment, synchronization component 160 identifies that a data field corresponding to attribute A2, depicted as vertex A2 in Raw Data 510, is modified. In an embodiment, synchronization component 160 queries all the child vertices of vertex A2, and then queries all the child vertices of the child vertices of vertex A2. The child vertices of vertex A2 are B1, B2, and B3 in Formatted Data 520, which are hashed in FIG. 5. The child vertices of B1, B2, and B3 include C1, C2, C3, and Cn, which are hashed in FIG. 5. In an embodiment, synchronization component 160 modifies attributes B1, B2, and B3 in Formatted Data 520 and subsequent attributes C1, C2, C3, and Cn in Insight Data 530 based on the modification to attribute A2.

Figure 6:
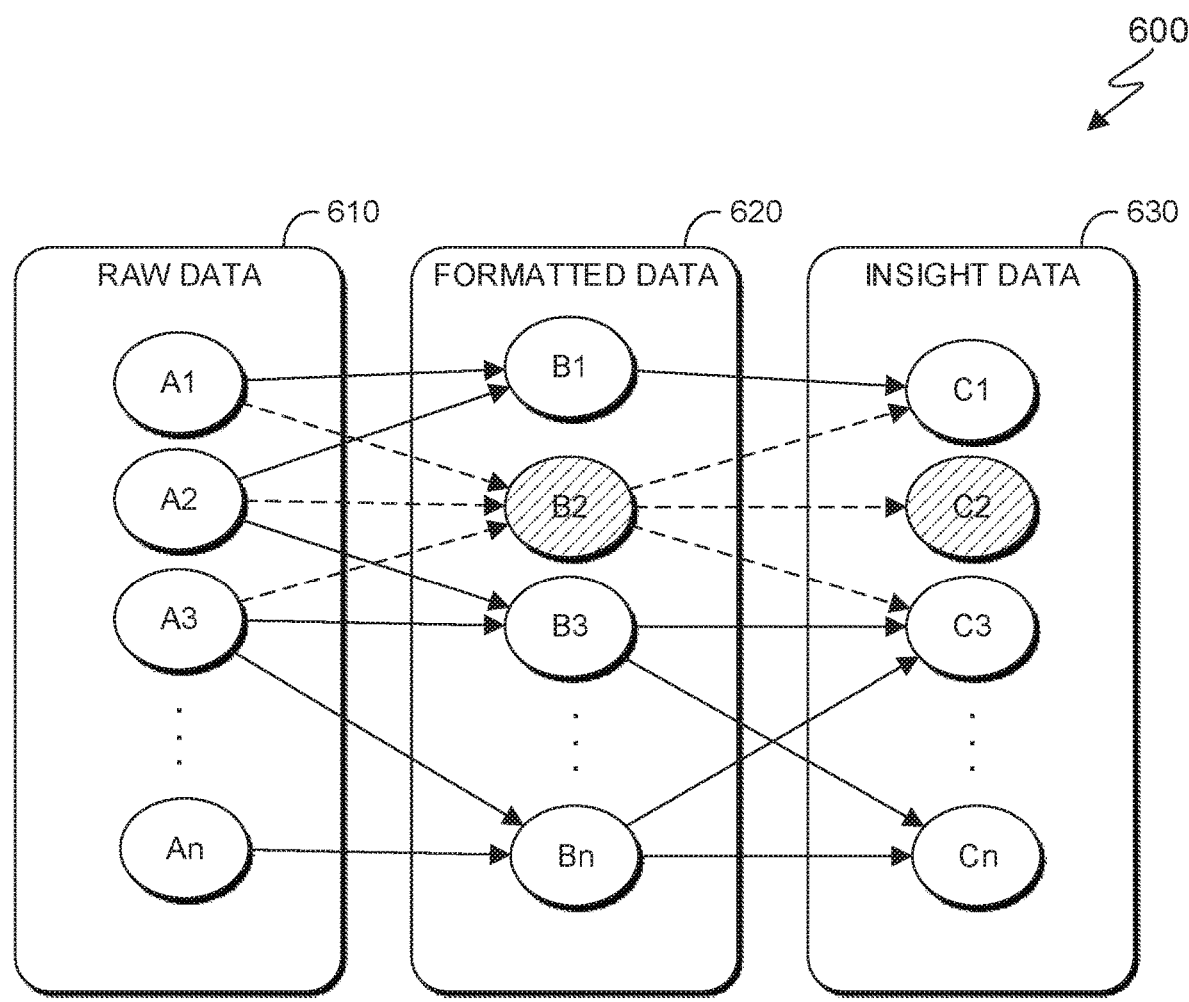
FIG. 6 depicts a relationship tree model in which a data field is deleted, in accordance with an embodiment of the present invention.

FIG. 6 depicts a relationship tree model 600 in which a data field is deleted, in accordance with an embodiment of the present invention. In an embodiment, synchronization component 160 identifies that a data field corresponding to attribute B2, depicted as vertex B2 in Raw Data 610, is deleted. In an embodiment, synchronization component 160 queries the parent vertices of vertex B2 and deletes the corresponding edges between vertex B2 and the parent vertices. The parent vertices of vertex B2 are A1, A2, and A3, so the corresponding edges between vertex B2 and vertices A1, A2, and A3 are deleted, shown as dashed lines in FIG. 6. In an embodiment, synchronization component 160 queries the child vertices of vertex B2 and deletes the corresponding edges and any vertices that have no edges remaining. The child vertices of vertex B2 are C1, C2, and C3, so the corresponding edges between vertex B2 and vertices C1, C2, and C3 are deleted, shown as dashed lines in FIG. 6, and vertex C2 is deleted because vertex B2 was the only parent vertex of C2, C2 is shown as hashed in FIG. 6. In an embodiment, synchronization component 160 deletes vertex B2.

Figure 7:
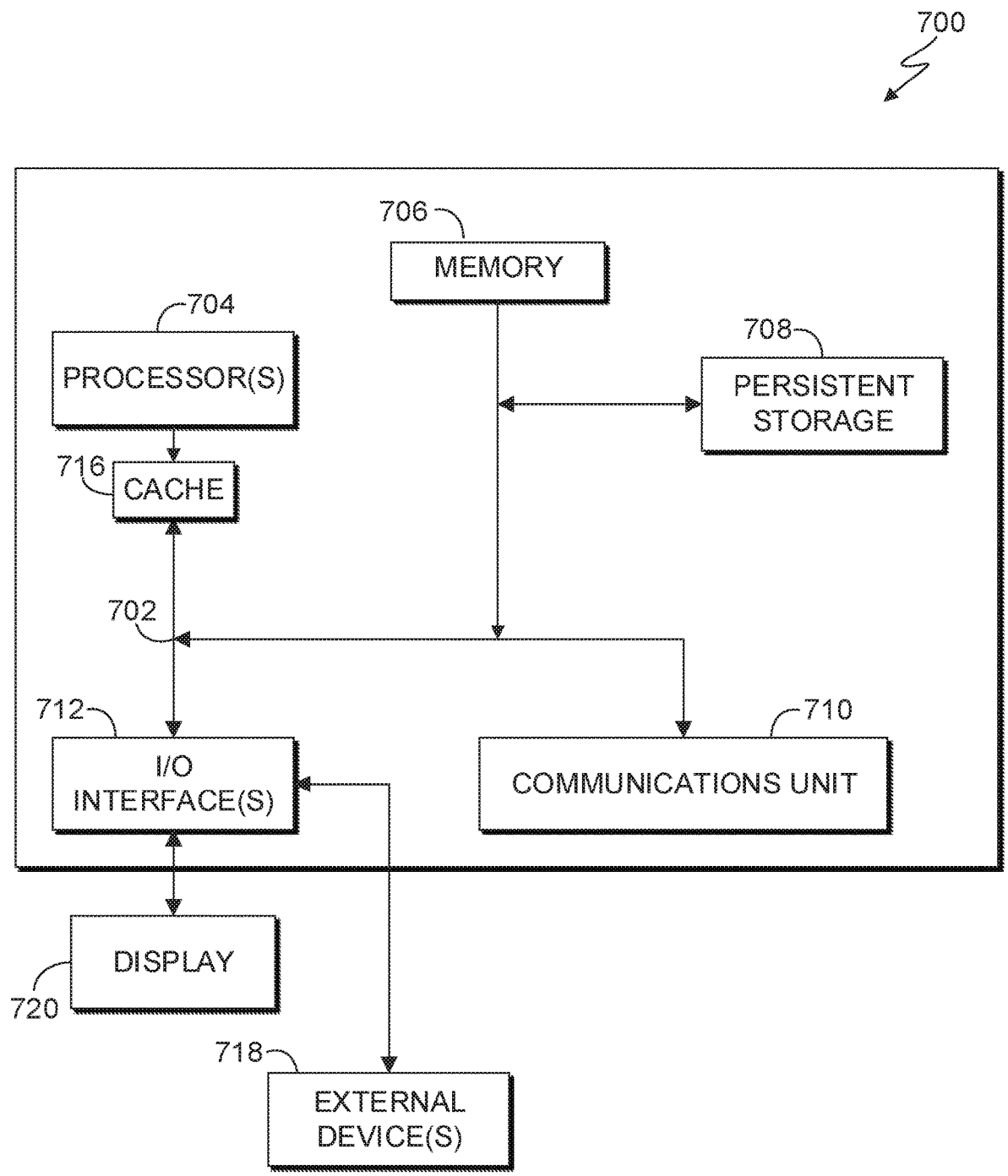
FIG. 7 depicts a block diagram of a computing device of data processing environment, in accordance with an embodiment of the present invention.

FIG. 7 depicts a block diagram of computer 700 suitable for computing device 110, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computer 700 includes communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Programs may be stored in persistent storage 708 and in memory 706 for execution and/or access by one or more of the respective computer processors 704 via cache 716. In an embodiment, persistent storage 708 includes a magnetic hard disk drive. Alternatively, or in addition to a magnetic hard disk drive, persistent storage 708 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Programs may be downloaded to persistent storage 708 through communications unit 710.

I/O interface(s) 712 allows for input and output of data with other devices that may be connected to computing device 110. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

Synchronization component 160 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for maintaining data synchronization, the computer-implemented method comprising:
   scanning, by one or more processors, a set of data fields at each stage of a data analysis process;
   generating, by one or more processors, a relationship tree model, wherein the set of data fields each correspond to a node in the relationship tree model;
   pruning, by one or more processors, the relationship tree model;
   responsive to an update to a data field of the set of data fields, promulgating, by one or more processors, the update using the relationship tree model to generate an updated set of insight data; and
   outputting, by one or more processors, the updated set of insight data.

2. The computer-implemented method of claim 1, further comprising:
   responsive to scanning the data field at each stage of the data analysis process, outputting, by one or more processors, a set of metadata associated with each data field of the set of data fields, wherein the set of metadata comprises a field name, a field type, a program module, a component, and other data fields that have a relationship with a particular data field.

3. The computer-implemented method of claim 2, wherein the field type is selected from the group consisting of raw data, formatted data, and insight data.

4. The computer-implemented method of claim 2, wherein the component is selected from the group consisting of a data collector component, a data handler component, and an insight component.

5. The computer-implemented method of claim 2, wherein generating the relationship tree model is based on the set of metadata associated with each data field of the set of data fields.

6. The computer-implemented method of claim 2, wherein promulgating the update using the relationship tree model to generate the updated set of insight data further comprises:
   identifying, by one or more processors, a set of nodes that are connected to the node corresponding to the data field that has been updated;
   updating, by one or more processors, the set of nodes based on the update to the data field; and
   generating, by one or more processors, the updated set of insight data based on the updated set of nodes.

7. The computer-implemented method of claim 1, wherein the update to the data field is selected from the group consisting of modifying the data field, adding the data field, and deleting the data field.

8. A computer program product for maintaining data synchronization, the computer program product comprising:
   one or more computer readable storage media and program instructions stored on the one or more computer readable storage media, the program instructions comprising:
   program instructions to scan a set of data fields at each stage of a data analysis process;
   program instructions to generate a relationship tree model, wherein the set of data fields each correspond to a node in the relationship tree model;
   program instructions to prune the relationship tree model;
   responsive to an update to a data field of the set of data fields, program instructions to promulgate the update using the relationship tree model to generate an updated set of insight data; and
   program instructions to output the updated set of insight data.

9. The computer program product of claim 8, further comprising:
   responsive to the program instructions to scan the data field at each stage of the data analysis process, program instructions to output a set of metadata associated with each data field of the set of data fields, wherein the set of metadata comprises a field name, a field type, a program module, a component, and other data fields that have a relationship with a particular data field.

10. The computer program product of claim 9, wherein the field type is selected from the group consisting of raw data, formatted data, and insight data.

11. The computer program product of claim 9, wherein the component is selected from the group consisting of a data collector component, a data handler component, and an insight component.

12. The computer program product of claim 9, wherein the program instructions to generate the relationship tree model is based on the set of metadata associated with each data field of the set of data fields.

13. The computer program product of claim 9, wherein the program instructions to promulgate the update using the relationship tree model to generate the updated set of insight data further comprises:

program instructions to identify a set of nodes that are connected to the node corresponding to the data field that has been updated;
program instructions to update the set of nodes based on the update to the data field; and
program instructions to generate the updated set of insight data based on the updated set of nodes.

14. The computer program product of claim 8, wherein the update to the data field is selected from the group consisting of modifying the data field, adding the data field, and deleting the data field.

15. A computer system for maintaining data synchronization, the computer system comprising:
one or more computer processors;
one or more computer readable storage media;
program instructions stored on the computer readable storage media for execution by at least one of the one or more processors, the program instructions comprising:
program instructions to scan a set of data fields at each stage of a data analysis process;
program instructions to generate a relationship tree model, wherein the set of data fields each correspond to a node in the relationship tree model;
program instructions to prune the relationship tree model;
responsive to an update to a data field of the set of data fields, program instructions to promulgate the update using the relationship tree model to generate an updated set of insight data; and
program instructions to output the updated set of insight data.

16. The computer system of claim 15, further comprising:
responsive to the program instructions to scan the data field at each stage of the data analysis process, program instructions to output a set of metadata associated with each data field of the set of data fields, wherein the set of metadata comprises a field name, a field type, a program module, a component, and other data fields that have a relationship with a particular data field.

17. The computer system of claim 16, wherein the field type is selected from the group consisting of raw data, formatted data, and insight data.

18. The computer system of claim 16, wherein the program instructions to generate the relationship tree model is based on the set of metadata associated with each data field of the set of data fields.

19. The computer system of claim 16, wherein the program instructions to promulgate the update using the relationship tree model to generate the updated set of insight data further comprises:
program instructions to identify a set of nodes that are connected to the node corresponding to the data field that has been updated;
program instructions to update the set of nodes based on the update to the data field; and
program instructions to generate the updated set of insight data based on the updated set of nodes.

20. The computer system of claim 15, wherein the update to the data field is selected from the group consisting of modifying the data field, adding the data field, and deleting the data field.

* * * * *